(12) United States Patent
Fukuda et al.

(10) Patent No.: US 8,094,350 B2
(45) Date of Patent: Jan. 10, 2012

(54) LASER PROCESSING APPARATUS

(75) Inventors: Naoaki Fukuda, Osaka (JP); Kazuyoshi Kunishio, Osaka (JP); Shigeaki Nakayama, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 166 days.

(21) Appl. No.: 12/419,653

(22) Filed: Apr. 7, 2009

(65) Prior Publication Data

US 2009/0189097 A1 Jul. 30, 2009

Related U.S. Application Data

(63) Continuation of application No. PCT/JP2007/069851, filed on Oct. 11, 2007.

(30) Foreign Application Priority Data

Oct. 12, 2006 (JP) .................................. 2006-279115

(51) Int. Cl.
*G02B 26/08* (2006.01)

(52) U.S. Cl. .................. 359/196.1; 359/221.2; 359/819

(58) Field of Classification Search ............... 359/196.1, 359/221.2, 321–323, 441, 819, 824; 219/121.62, 219/121.81

See application file for complete search history.

(56) References Cited

U.S. PATENT DOCUMENTS

| | | | | |
|---|---|---|---|---|
| 4,734,557 A | * | 3/1988 | Alfille et al. ............. | 219/121.74 |
| 6,215,095 B1 | * | 4/2001 | Partanen et al. ......... | 219/121.62 |
| 6,388,823 B1 | * | 5/2002 | Gaber et al. .................. | 359/819 |
| 6,447,125 B1 | * | 9/2002 | Huonker et al. ............. | 359/846 |
| 6,528,762 B2 | * | 3/2003 | Mayer ...................... | 219/121.83 |
| 6,844,994 B2 | * | 1/2005 | Melzer et al. ................. | 359/824 |
| 2004/0100704 A1 | * | 5/2004 | Shadduck ..................... | 359/819 |
| 2008/0017618 A1 | * | 1/2008 | Bruland et al. .......... | 219/121.69 |

FOREIGN PATENT DOCUMENTS

| | | | |
|---|---|---|---|
| JP | 61137693 A | * | 6/1986 |
| JP | 3-47501 U | | 5/1991 |
| JP | 4-305387 A | | 10/1992 |
| JP | 2002-239768 A | | 8/2002 |
| JP | 2006-7257 A | | 1/2006 |

OTHER PUBLICATIONS

International Search Report issued Jan. 15, 2008 in International application No. PCT/JP2007/069851.

* cited by examiner

*Primary Examiner* — Frank Font
(74) *Attorney, Agent, or Firm* — Brinks, Hofer, Gilson & Lione

(57) ABSTRACT

A laser processing apparatus which performs a predetermined processing by irradiating a laser beam (2) emitted from a laser oscillator onto a surface of a workpiece (1) through a condenser lens (3). There are provided microdeformation lenses (4), (5) for changing the beam shape in the vertical direction and the horizontal direction in a laser beam (2), for example, and a lens deformation control device for controlling the amount of deformation of the microdeformation lenses (4), (5) which are to adjust the beam shape of the laser beam (2) to a predetermined shape. The microdeformation lenses (4), (5) have a structure such that they can be caused to change to a desired shape by means of a plurality of actuators (4*b*), (5*b*) disposed around the outer periphery of the lenses. High-precision processing can be achieved, while maintaining the desired beam shape, even if the shape of the workpiece changes, since the laser beam shape can be rapidly changed to the desired shape, on a smooth curved surface equivalent to that of an ordinary lens.

7 Claims, 5 Drawing Sheets

(a)

(b)

(a)

(b)

(a)

(b)

(c) Distance is held constant (maintenance of beamshape)

(a)

(b)

(a)

(b)

(c)

(d)

US 8,094,350 B2

LASER PROCESSING APPARATUS

RELATED APPLICATIONS

This application is a continuation of PCT/JP2007/069851, filed on Oct. 11, 2007, which claims priority to Japanese Application No. JP2006-279115, filed on Oct. 12, 2006. The entire contents of these applications are incorporated herein by references.

BACKGROUND OF THE INVENTION

1. Field of the Invention

The present invention relates to a laser processing apparatus which performs a processing by irradiating a laser beam emitted from a laser oscillator onto a surface of a workpiece through a condenser lens which condenses the laser beam on the workpiece.

2. Description of the Related Arts

When using laser beams in the processing of a workpiece, it is a routine practice to change the laser beams to the desired size and shape according to the workpiece. A typical example of a specific method for changing the shape of laser beams involves changing the beam shape by moving 2 or more lenses.

In this method, a mechanism is required for moving the lenses, but there is a limit to the speed at which such a lens-moving mechanism is capable of responding in cases where processing of a workpiece is to be performed at high speeds or in cases where adjustment change to the desired beam shape is to be made rapidly, thus resulting in the drawback that it cannot be used.

Accordingly, in order to eliminate this drawback, a laser processing apparatus was disclosed which adjusts to the desired beam shape at high speeds by deforming microdeformation mirrors by means of actuators (e.g., Japanese Patent Application Kokai Publication No. 2006-7257).

In Patent Reference 1, there are no drawings illustrating the detailed structure of the microdeformation mirrors, but there is a description of a structure wherein electrodes serving as about 40 actuators are covered with a transparent film formed by coating, and the transparent film is caused to undergo microdeformation due to an electric drag force generated by the actuators.

However, in the case of such microdeformation mirrors, since the mirror surface at the time of deformation does not form a smooth curved surface, but tends, rather, to form a pseudo-curved surface, it is thought that discontinuities readily arise in laser beam intensity distribution.

SUMMARY OF THE INVENTION

The problems which the present invention aims to solve are: (1) In the method whereby 2 or more lenses are moved by means of a moving mechanism when changing a laser beam to a desired size and shape, there is a limit to the speed at which it is capable of responding to rapidly change to the desired beam shape; and (2) In the method whereby the microdeformation mirrors are deformed by means of actuators, discontinuities readily arise in laser beam intensity distribution.

The laser processing apparatus of the present invention performs a processing by irradiating a laser beam emitted from a laser oscillator onto a surface of a workpiece through a condenser lens so as to rapidly change to the desired beam shape on a smooth curved surface. The apparatus comprises at least one microdeformation lens which changes the beam shape of the laser beam, and a lens deformation control device for controlling the amount of deformation of the at least one microdeformation lens in order to change the beam shape of the laser beam to a predetermined shape. The microdeformation lenses have a structure such that they can be caused to change to the predetermined shape by means of a plurality of actuators disposed around the outer periphery of the lenses.

Control of the amount of microdeformation in the microdeformation lenses of the laser processing apparatus of the present invention is accomplished by controlling the operating position and/or the operating amount of the plurality of actuators.

The laser processing apparatus of the present invention further comprises a processing distance measurement device for measuring the distance from the condenser lens to the workpiece. There is a first microdeformation lens for changing the beam shape in one direction, and a second microdeformation lens for changing the beam shape in the other direction. The focal point position is corrected, while maintaining the laser beam shape after being changed to a predetermined shape by the first microdeformation lens and/or the second microdeformation lens, by controlling the amount of deformation of the first microdeformation lens and the second microdeformation lens according to the distance from the condenser lens to the workpiece, measured by the processing distance measuring device, thereby making it possible to accurately adjust to changes in focal point position according to the distance from the workpiece.

In the present invention, due to the fact that the curved surfaces of the lenses during deformation of the microdeformation lenses are smooth curved surfaces equivalent to ordinary lenses, it becomes possible to reduce discontinuities in laser intensity distribution, thereby making it possible to reduce processing flaws in the workpiece and to achieve high-precision processing. In addition, since it is possible to rapidly change the laser beam to the desired beam shape, it is also possible to apply it to cases where processing of a workpiece is to be performed at high speeds.

DETAILED DESCRIPTION OF THE PREFERRED EMBODIMENT

The present invention achieves its objective of rapidly changing to the desired beam shape on a smooth curved surface by means of the following constitution.

The present invention changes the shape of microdeformation lenses which change the beam shape of the laser beam shape to the desired shape by controlling the operating position and/or the operating amount of a plurality of actuators disposed around the outer periphery of the lenses.

EXAMPLES

A preferred embodiment of the present invention is described in detail with FIGS. 1-6 with various embodiments of the invention.

Figure 1:
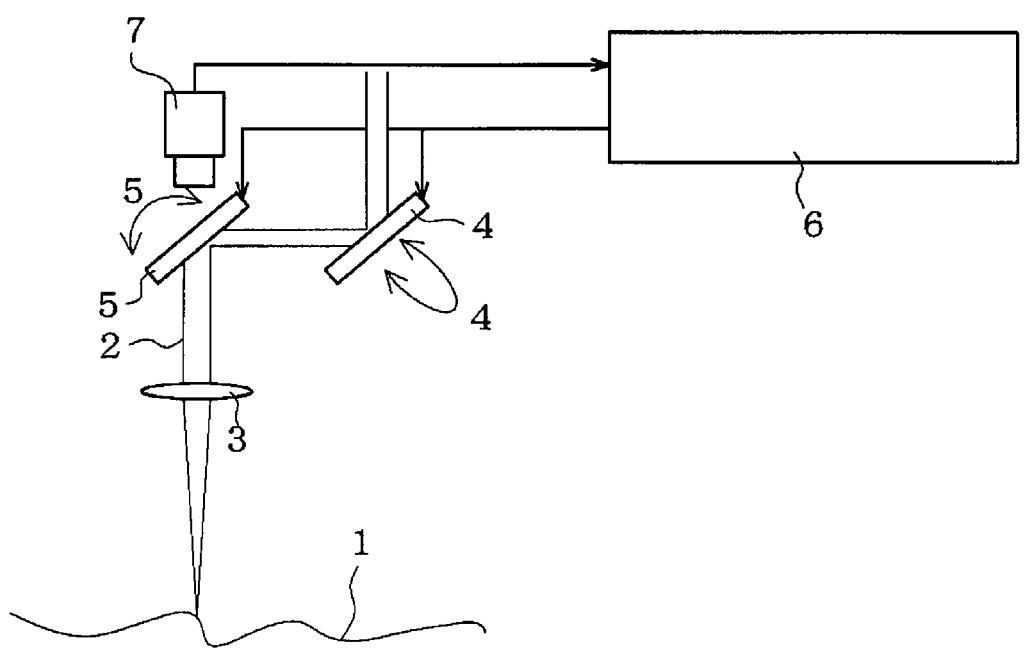
FIG. 1 is a diagram illustrating an example of the basic structure of a laser processing apparatus of the present invention.
Figure 2:
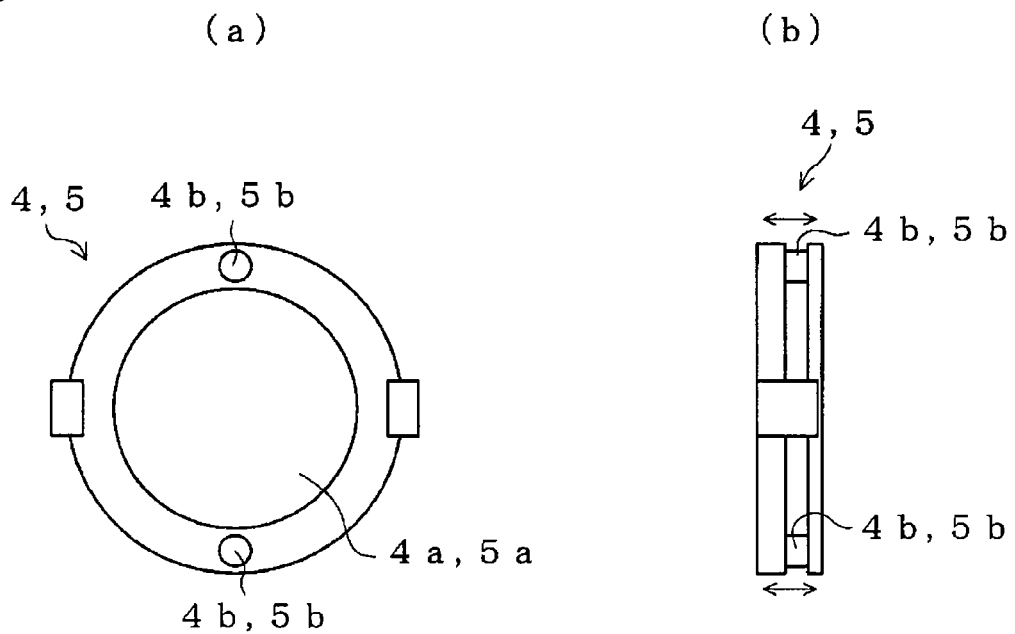
FIG. 2 is a basic structural diagram for when a beam shape is changed, where FIG. 2 (a) is a frontal view and FIG. 2 (b) is a side view.
Figure 3:
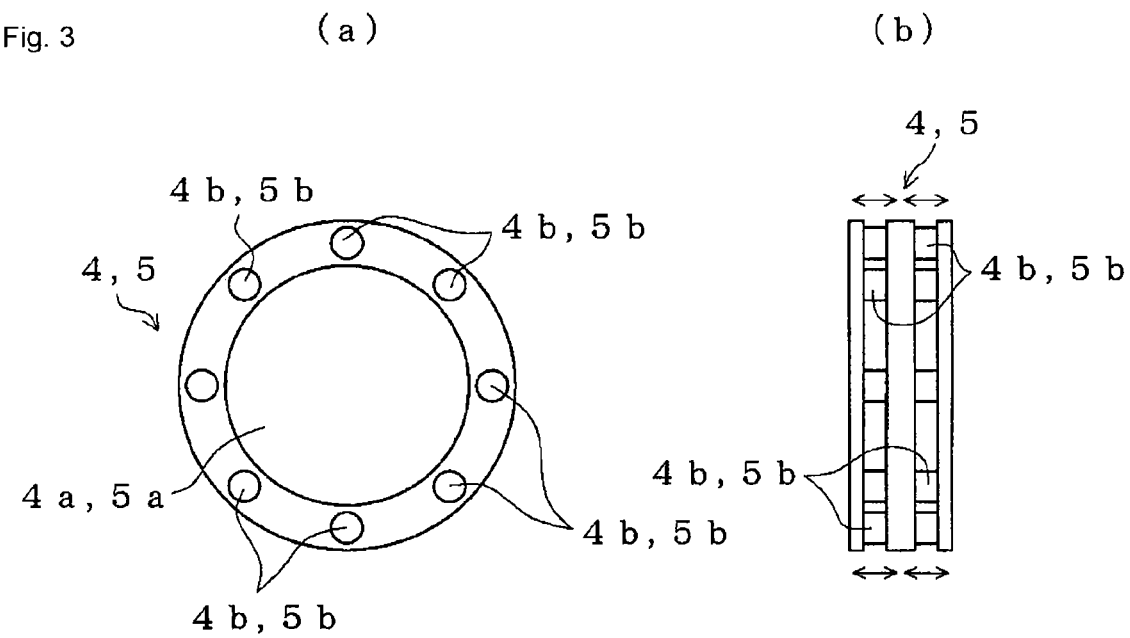
FIG. 3 is an applied structural diagram for when a beam shape is changed, where FIG. 3 (a) is a frontal view and FIG. 3 (b) is a side view.
Figure 4:
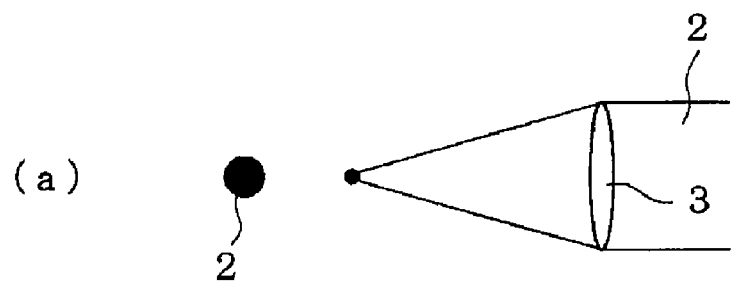
FIG. 4 is a diagram illustrating the focal point position during processing, where FIG. 4 (a) describes a typical focal point position, FIG. 4 (b) describes a focal point position after beam shape is changed, and FIG. 4 (c) describes a focal point position during actual processing.
Figure 4:
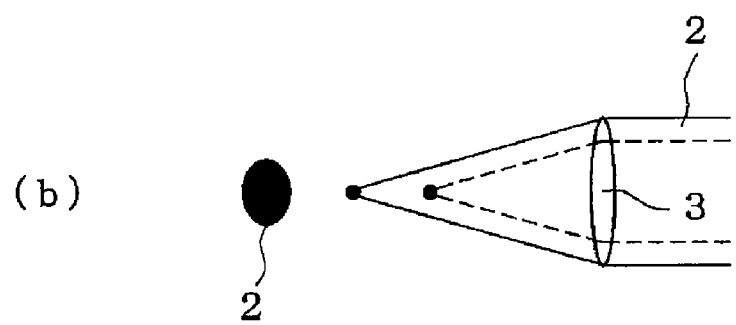
Figure 4:
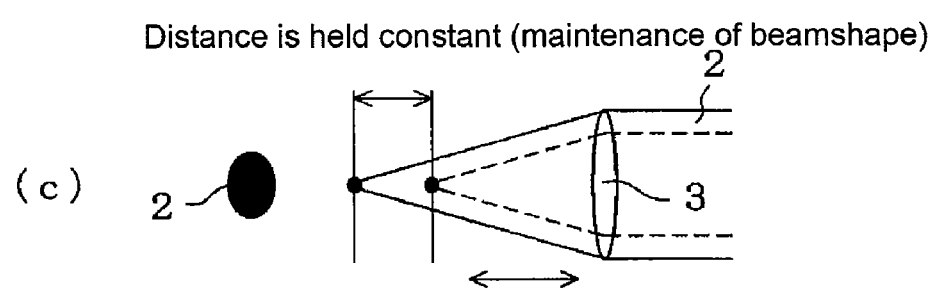
Figure 5:
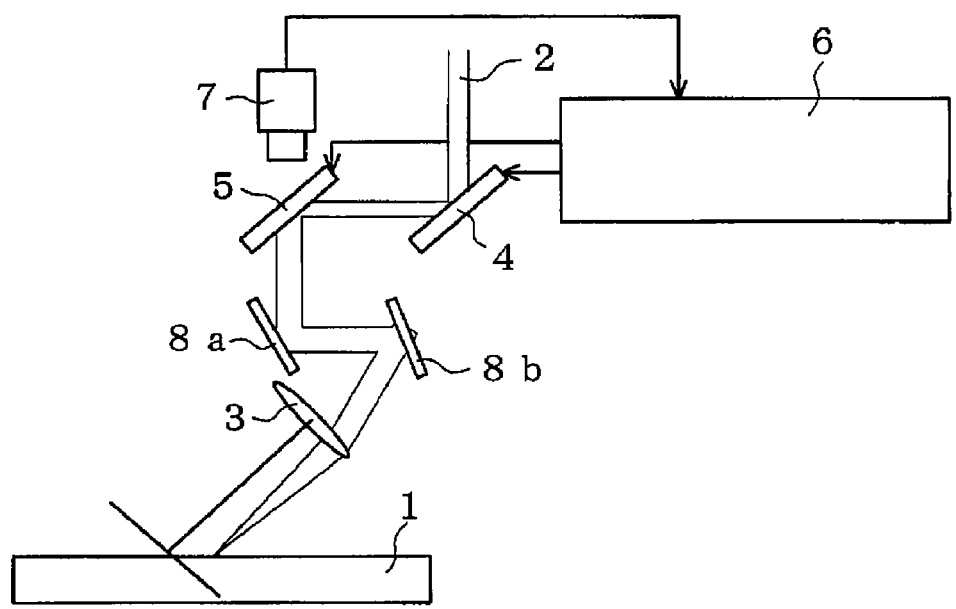
FIGS. 5 (a) and (b) are schematic diagrams illustrating examples of the basic structure of another laser processing apparatus of the present invention.
Figure 5:
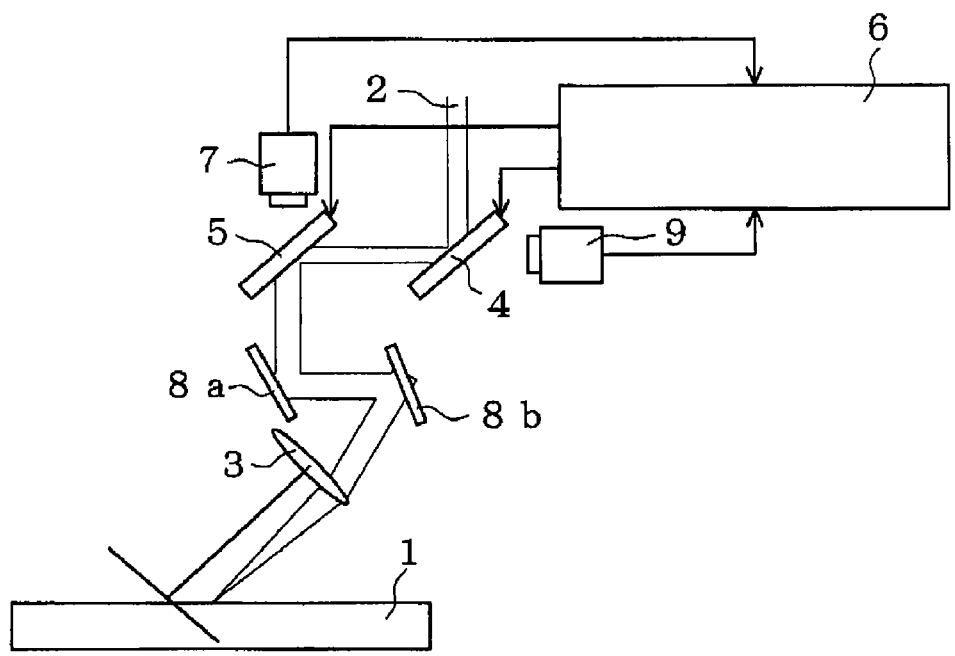
Figure 6:
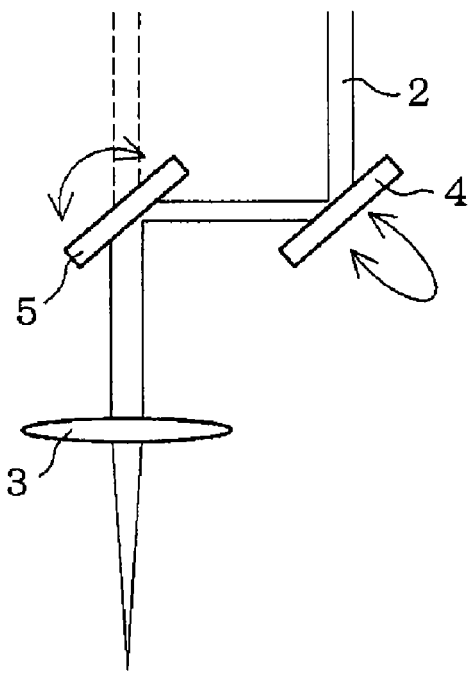
FIG. 6 (a) is a schematic diagram illustrating an example the basic structure of yet another laser processing apparatus of the present invention, and FIG. 6 (b)-(d) are diagrams of waveforms of laser beams at various positions.
Figure 6:
Figure 6:
Figure 6:
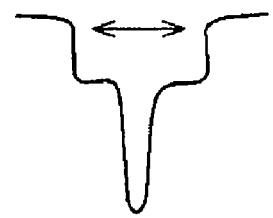

FIG. 1 is a diagram illustrating an example of the basic structure of a laser processing apparatus of the present invention. FIG. 2 is a basic structural diagram for when a beam shape is changed. FIG. 3 is an applied structural diagram for when a beam shape is changed. FIG. 4 is a diagram illustrating the focal point position during processing. FIG. 5 and FIG. 6 are schematic diagrams illustrating other examples of a laser processing apparatus of the present invention.

FIG. 1 illustrates an example of a laser processing apparatus of the present invention when removing a metal layer formed on the surface of a workpiece 1 such as a substrate.

In FIG. 1, Reference Numeral 2 is a laser beam emitted, for example, from a YAG laser oscillator (referred to below simply as a laser oscillator), having a wavelength and intensity at least one of which is set suitable for removing a metal layer. The laser beam 2 emitted from this laser oscillator is irradiated onto the surface of the workpiece 1, through a condenser lens 3, to remove the metal layer.

In such a laser processing apparatus of the present invention, two microdeformation lenses 4 and 5 are arranged to change the beam shape in the X (horizontal) and Y (vertical) directions, for example, in an optical path between the laser oscillator and the condenser lens 3. Moreover, the amount of deformation of these two microdeformation lenses 4 and 5 is controlled by a lens deformation control device 6.

As shown in FIG. 2 and FIG. 3, the microdeformation lenses 4 and 5 have a structure such that a plurality of actuators (such as piezoelectric elements) 4b and 5b are disposed around the outer periphery of commercially available lenses (BK7 glass, quartz glass, etc.) 4a and 5a at predetermined intervals (e.g., equal intervals). Accordingly, light can be transmitted through lenses 4 and 5 as ordinary lenses under certain circumstances/conditions as shown in FIGS. 1, 5(a)-(b) and 6(a). For example, light is transmitted to device 7 by lens 5 in FIGS. 1 and 5(a)-(b). In addition, as shown in FIGS. 1, 5(a)-(b) and 6(a), light can be reflected off of lenses 4 and 5 under certain circumstances/conditions. Note that while light can be transmitted through lenses 4 and 5, FIG. 1 only shows the light beam that is necessar to understand the present invention.

The lens deformation control device 6 determines at what operating amount to operate which actuators 4b and 5b, according to the change in beam shape, so as to change the lenses 4a and 5a to the desired shape, thereby changing the beam shape.

In this case, it is possible to subject the lenses 4a and 5a to microdeformation by arranging at least two actuators 4b and 5b, as shown in FIG. 2. It is also possible to subject the lenses 4a and 5a to microdeformation in any direction at high speed, if the actuators 4b and 5b are arranged so as to encompass the outer periphery of the lenses 4a and 5a, as shown in FIG. 3.

Such microdeformation lenses 4 and 5 are designed so that the lenses 4a and 5a can be changed to the desired shape at higher speeds than in conventional cases where lenses are operated mechanically. Furthermore, the curved surfaces of the lenses are smoother after deformation than in methods where deformation is performed with actuators from behind the mirrors, since the shape of the lenses 4a and 5a is adjusted by the actuators 4b and 5b which encompass the outer periphery of the lenses 4a and 5a. Moreover, it is possible to observe the state of laser processing while laser the processing is being performed, since transmitted light can be utilized.

In the course of processing the workpiece 1 with shape-changed laser beam 2, slippage occurs in the focal point position when there are irregularities in the surface of the workpiece as shown in FIG. 1. However, the laser processing apparatus of the present invention is able to adapt to such changes in the focal point position, by mutually changing the shape of the two microdeformation lenses 4 and 5 shown in FIG. 1.

That is to say, in contrast to the focal point position of the laser beam 2 with a circular cross section shown in FIG. 4 (a), when the laser beam 2 has an elliptical cross section with a vertical main axis shown in FIG. 4 (b), the focal point position shortens, as shown by the broken line.

Therefore, it is possible to implement high-speed correction of the focal point position only, by moving the condenser lens 3 as in FIG. 4 (c), while maintaining the changed state of the beam shape such as in FIG. 4 (b), for example, which was changed by means of a microdeformation lens 4 (the Y-direction in FIG. 1). Accordingly, it is possible to adjust to changes the focal point position even when performing high-speed processing of the workpiece 1.

When adjusting to changes in the focal point position, the distance from the condenser lens 3 to the workpiece is measured with a processing distance measurement device (CCD camera for observation) 7 installed on the rear surface side of the X-direction microdeformation lens 5, for example. The amount of deformation of the microdeformation lenses 4 and 5 is controlled in response to this measured distance, and the focal point position can be corrected while maintaining the shape of the changed laser beam 2.

Moreover, when processing the workpiece 1 by diagonally irradiating the laser beam 2, as shown in FIG. 5, the focal point position changes according to the distance from the workpiece 1 and the angle of incidence. Accordingly, the amount of deformation of the microdeformation lenses 4 and 5 is controlled by utilizing the fact that the laser beam 2 arrives at the workpiece 1 in a straight line from the condenser lens 3. In other words, the amount of deformation is controlled by calculating the amount of correction of the focal point distance from the distance from the workpiece 1, by using the angle of incidence of the laser beam 2 and the position at which the laser beam 2 reaches the condenser lens 3 from galvanomirrors 8a and 8b disposed between the X direction microdeformation lens 5 and the condenser lens 3. Consequently, high-precision processing is possible even with laser processing using diagonal irradiation.

FIG. 5 (a) illustrates an example in which the laser irradiation position and the beam shape are controlled when an output signal is generated from the lens deformation control device 6 to the X and Y-direction microdeformation lenses 4 and 5, on the basis of input signals from the processing distance measurement device 7, which ascertains the laser irradiation position on the workpiece 1, and also observes whether a predetermined beam shape has been achieved.

FIG. 5 (b) illustrates an example in which a CCD camera 9 for inspection is added to the rear surface side of the Y-direction microdeformation lens 4. In cases where the CCD camera 9 for inspection is added, it becomes possible to examine whether only the metal material designated for processing has been processed, by detecting a characteristic flame reaction color for the metal material at the time of laser processing, for, instance, when only a specified metal material of the workpiece 1 is to be processed. Therefore, if the flame reaction color is not characteristic of the specified material, then it is conceivable that slippage of the processing position has occurred. Thus, as above, the irradiation position of the laser beam 2 is corrected by generating an output signal from the lens deformation control device 6 to the X and Y-direction microdeformation lenses 4 and 5. Note that as with FIG. 1, FIGS. 5(a) and 5(b) only show those light beams that are necessary to understand the present invention.

In an example where a laser beam is allowed to pass through a microdeformation lens, it is possible not only to directly observe the state of processing using the processing distance measurement device (CCD camera for observation) 7, but it is also possible to combine transmitted light (broken line) and reflected light (solid line) at the X-direction microdeformation lens 5, as shown in FIG. 6 (a). However, if transmitted light is used in the X-direction microdeformation lens 5, then it is not possible to change the beam shape in the X-direction, and the beam shape is changed by using only the Y-direction microdeformation lens 4. FIG. 6 (b) shows the wave form of the laser beam 2 prior to reflection by the Y-direction microdeformation lens 4. FIG. 6 (c) shows the wave form of the laser beam 2 prior to passing through the X-direction microdeformation lens 5. FIG. 6 (d) shows the wave form of the laser beam 2 after passing through the condenser lens 3.

The present invention is not limited to the above examples, and the embodiments can of course be suitably modified, as long as they are within the scope of the technical ideas recited in the claims.

For example, in the above examples, the operating position and the operating amount of the actuators are controlled together, but if it is possible to change to a predetermined shape, then only one of either of them may be controlled. Moreover, if processing is to be performed on only a limited area such as a junction to a substrate of an IC chip in electronic circuitry, it is possible to use one microdeformation lens in laser processing in which the beam shape of a laser beam is changed in only one direction.

The structure of the apparatus of the present invention is not limited to the structures shown in FIG. 1 and FIG. 5, but in the example shown in FIG. 5 (b), for example, if the processing distance measurement device 7 is installed on the rear surface side of the Y-direction microdeformation lens 4, it is no longer possible to detect the beam shape since the beam is deformed by the X-direction microdeformation lens 5 at a later stage.

The present invention can be used for laser processing such as thin-film removal, micromachining, and the like, as long as the processing requires the irradiation of a laser beam onto a workpiece.

What is claimed is:

1. Laser processing apparatus which performs a processing by irradiating a laser beam emitted from a laser oscillator onto a surface of a workpiece through a condenser lens, comprising:
    a microdeformation lens which changes a beam shape of the laser beam, wherein the microdeformation lens allows light to pass from a first side of the microdeformation lens through the microdeformation lens and out of a second side of the microdeformation lens that is opposite of the first side of the microdeformation lens under certain conditions;
    a lens deformation control device for controlling an amount of deformation of the microdeformation lens in order to change a shape of the laser beam to a predetermined shape; and
    a plurality of actuators disposed around an outer periphery of the microdeformation lens to change the shape of the microdeformation lens to the predetermined shape.

2. The laser processing apparatus according to claim 1, wherein control of an amount of deformation in the microdeformation lens is accomplished by controlling which ones of said plurality of actuators are activated to operate.

3. The laser processing apparatus according to claim 1, wherein the microdeformation lens changes the shape of the laser beam in one direction; and the laser processing apparatus comprises a second microdeformation lens for changing the shape of the laser beam in another direction.

4. The laser processing apparatus according to claim 3, further comprising a processing distance measurement device for measuring a distance from the condenser lens to the workpiece, wherein a focal point position is corrected, while maintaining the shape of the laser beam which has been changed to the predetermined shape by the microdeformation lens and/or the second microdeformation lens, by controlling the amount of deformation of the microdeformation lens and the second microdeformation lens according to a distance from the condenser lens to the workpiece measured by this processing distance measurement device.

5. The laser processing apparatus according to claim 1, wherein control of an amount of deformation in the microdeformation lens is accomplished by controlling a percent amount of operation of one of said plurality of actuators.

6. The laser processing apparatus according to claim 3, wherein the second microdeformation lens allows light to pass from a first side of the second microdeformation lens through the second microdeformation lens and out of a second side of the second microdeformation lens that is opposite of the first side of the second microdeformation lens under certain conditions.

7. The laser processing apparatus according to claim 1, wherein the plurality of actuators are positioned along an annular outer portion of the microdeformation lens that is centered about an axis of the microdeformation lens.

* * * * *

UNITED STATES PATENT AND TRADEMARK OFFICE
CERTIFICATE OF CORRECTION

PATENT NO. : 8,094,350 B2
APPLICATION NO. : 12/419653
DATED : January 10, 2012
INVENTOR(S) : Naoaki Fukuda et al.

It is certified that error appears in the above-identified patent and that said Letters Patent is hereby corrected as shown below:

In column 3, line 50, after "the light beam that is" replace "necessar" with --necessary--.

Signed and Sealed this
Twenty-ninth Day of May, 2012

David J. Kappos
*Director of the United States Patent and Trademark Office*